Patented Jan. 9, 1923.

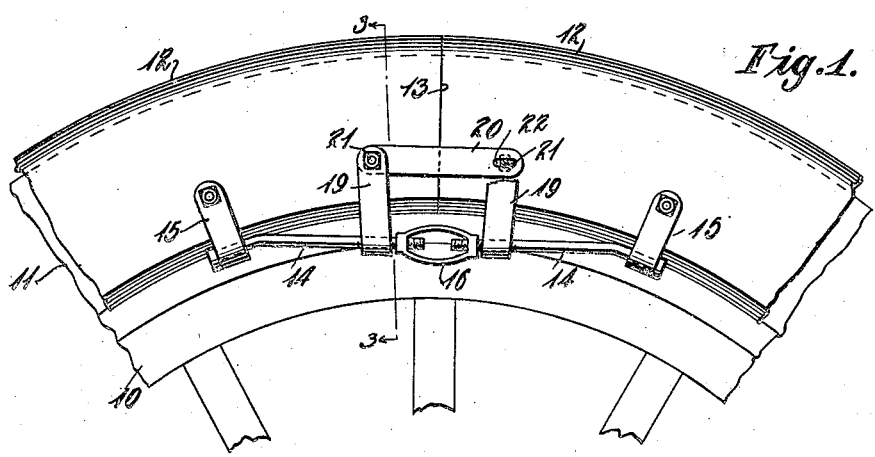
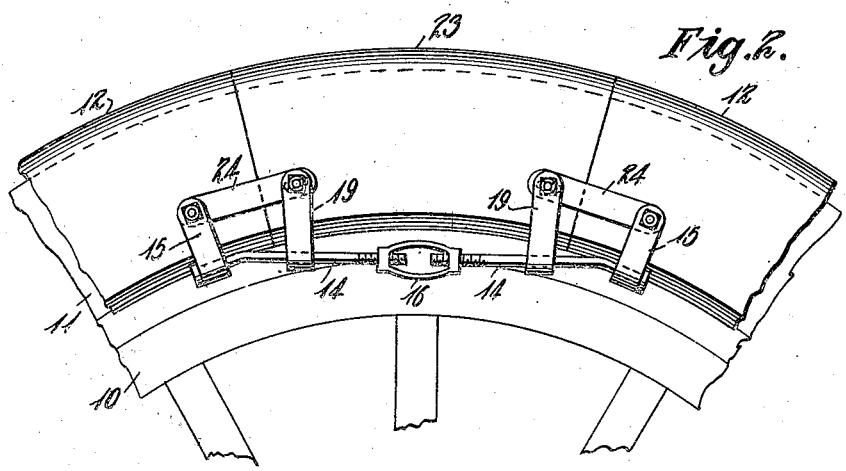
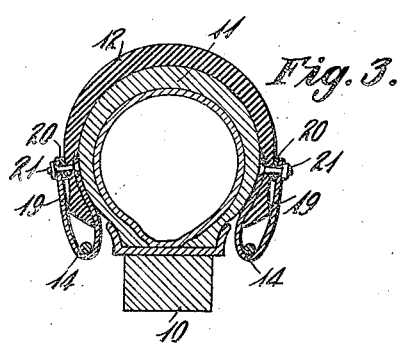
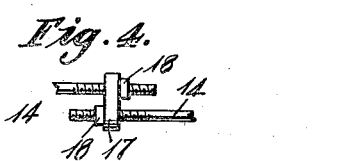

1,441,262

UNITED STATES PATENT OFFICE.

WILLIAM C. BARDO AND JOHN H. BARDO, OF ARKANSAS CITY, KANSAS.

REMOVABLE OVERTREAD FOR PNEUMATIC TIRES.

Application filed May 15, 1922. Serial No. 560,988.

*To all whom it may concern:*

Be it known that WILLIAM C. BARDO and JOHN H. BARDO, citizens of the United States, residing at Arkansas City, in the county of Cowley and State of Kansas, have invented certain new and useful Improvements in Removable Overtreads for Pneumatic Tires, of which the following is a specification.

This invention has reference to a removable overtread for pneumatic tires and means for fastening the same on the latter.

An object of the invention is to provide an over tread made from discarded pneumatic tires which may be used to protect either good or badly worn tires from wearing thin and blowing out, thus obtaining further wear and service from such tires.

An additional object of the invention is to provide an overtread of the character above specified which is provided with improved fastening means whereby it may be readily and conveniently attached in place over the tire with which it is used.

Various other objects and advantages of the invention will become apparent during the following description.

In the drawing:

Figure 1 is a side elevation of a section of an automobile wheel showing the manner of applying the overtread to the tire.

Figure 2 a similar view of the invention in slightly modified form,

Figure 3 a vertical cross section taken on line 3—3 of Figure 1, and

Figure 4 a detailed view of tensioning device constituting part of the overtread fastening means.

Describing the invention in detail 10 designates a section of an automobile wheel and 11, the pneumatic tire carried thereby and to which overtread is applied. The overtread is indicated at 12 and may be made out of damaged and discarded overshoes of pneumatic tires, the same being cut apart radially as at 13, so as to fit readily around the tire.

The overtread thus made is held firmly in place by suitable fasteners which are arranged on each side of the wheel. Each fastener comprises a pair of tensioning rods 14 respectively anchored to the rim of the overtread on opposite sides of the joint 13 by means of clevises 15 and adjustably connected at their adjacent ends either by a turn-buckle 16, or by means of a union plate 17 and nuts 18 as shown in Figure 4.

Attached to the rim of the overtread between the anchorage of the tension rods and on opposite sides of the joint 13 are clevises 19 which engage tension rods 14 as illustrated in the drawing. Extending from one clevis to the other and crosswise of joint 13 is a reenforcing plate 20 which fastens to the clevis bolt 21 at each end, one end of this plate has a slot 22 where the clevis bolt goes thru for simplifying adjustment. Clevises 15 and 19 are turned back under the overtread and engaged by the clevis bolts as shown in Figure 3.

In using the overtread, the same is placed around the tire so as to completely cover the tread of the latter and the fastening means operated for clamping the overtread in place. When the tension rods 14 are drawn together either by turning buckle 16 or the nuts 18, the adjacent ends of the overtread will be drawn together at the joint, causing the overtread to be contracted snugly about the inflated tire. As shown in Figure 3. By means of this overtread it is possible to obtain longer service from tires which are thus protected against punctures and blowout even tho such tires are old and badly worn. It also provides means for converting discarded tires-shoes into retreads at little or no expense.

The type of fastener illustrated in Figure 1 is especially adapted to an overtread which is in one piece. However, where the overshoe is so short that a space occurs between the adjacent ends thereof when disposed about a tire, the gap may be filled with a small auxiliary section 23 placed between the ends as shown in Figure 2. The same type of fastener is used for connecting the ends of this overtread as is employed with the overtread of Figure 1, although, the manner of applying the same differs slightly from the latter in that clevises 15 and 19 are relatively connected in pairs by a union plate 24 which extends crosswise of the joint between one end of filler strip 23 and the adjacent end of the overtread.

From the foregoing it is believed that the advantages and novel features of the invention can be readily understood and that further detailed description is unnecessary.

What is claimed is:

1. An overtread for pneumatic tires comprising an outer shoe adapted to embrace the tire about the tread portion thereof, said shoe being cut apart radially to provide a joint, tension rods anchored to the rim of the shoe on both sides of the overtread and on opposite sides of the said joint, clevises attached to the rim of said shoe between the anchorage of the tension rods and engaging the latter to anchor the shoe thereto, reenforcing plates extending between and connecting the clevises on each side of the said shoe, said plates extending crosswise of the joint of the overtread, and means for placing the said rods under tension to contract the over shoe at the joint whereby it will snugly engage the tire to which applied.

2. An overtread for pneumatic tires comprising an outer covering or shoe adapted to embrace the tire about the tread portion thereof, said shoe being cut apart radially at one point to provide a joint, an auxiliary-shoe section fitting in between the ends of the overtread adjacent the joint of the latter and fastening means anchored to the said over tread on opposite sides of the latter and crosswise of the joints thereof, said fastening means being adjustable for contracting the shoe at the joints whereby the same will snugly engage the tire to which applied.

In testimony whereof we affix our signatures.

WILLIAM C. BARDO.
JOHN H. BARDO.